US007347314B2

(12) United States Patent
Lombard

(10) Patent No.: US 7,347,314 B2
(45) Date of Patent: Mar. 25, 2008

(54) MOVABLE WALKWAYS AND ESCALATORS

(75) Inventor: Morné Robert Lombard, Boksburg (ZA)

(73) Assignee: Otis (Proprietary) Limited, Wadeville, Johannesburg (ZA)

( * ) Notice: Subject to any disclaimer, the term of this patent is extended or adjusted under 35 U.S.C. 154(b) by 188 days.

(21) Appl. No.: 10/513,127

(22) PCT Filed: Apr. 25, 2003

(86) PCT No.: PCT/IB03/01572

§ 371 (c)(1),
(2), (4) Date: Jun. 10, 2005

(87) PCT Pub. No.: WO03/093159

PCT Pub. Date: Nov. 13, 2003

(65) Prior Publication Data

US 2006/0175177 A1 Aug. 10, 2006

(51) Int. Cl.
*B65G 45/00* (2006.01)
*B65G 45/10* (2006.01)

(52) U.S. Cl. ...................................... 198/493; 198/494

(58) Field of Classification Search ................ 198/493, 198/494

See application file for complete search history.

(56) References Cited

U.S. PATENT DOCUMENTS

| | | | | |
|---|---|---|---|---|
| 3,946,853 A * | 3/1976 | Ishida | ........................ | 198/494 |
| 4,698,486 A * | 10/1987 | Sheets | ........................ | 219/390 |
| 4,934,512 A * | 6/1990 | Lin et al. | .................... | 198/495 |
| 4,976,342 A * | 12/1990 | Hwang | ....................... | 198/495 |

FOREIGN PATENT DOCUMENTS

| | | |
|---|---|---|
| DE | 2257841 | 5/1974 |
| JP | 11 116173 | 4/1999 |
| JP | 11116173 A * | 4/1999 |

* cited by examiner

*Primary Examiner*—Gene C Crawford
*Assistant Examiner*—Kavel Singh
(74) *Attorney, Agent, or Firm*—Welsh & Katz, Ltd.

(57) ABSTRACT

The invention provides a movable walkway installation (10), such as an escalator or a travelator, which installation (10) includes a movable support member (18) for transporting persons supported thereon, a movable handrail (16) for gripping by persons transported by the movable support member (18), and a disinfecting device (14) which is installed and positioned for disinfecting the movable handrail (16) during movement of the handrail (16) past the disinfecting device (14). The disinfecting device (10) may be arranged to produce ultra-violet radiation selected to have a disinfecting or germicidal effect.

13 Claims, 3 Drawing Sheets

MOVABLE WALKWAYS AND ESCALATORS

This invention relates to movable walkways and escalators. In particular, it relates to a movable walkway installation, and to a method of operating a movable walkway.

The invention provides a movable walkway installation which includes:

a movable support member for transporting persons supported thereon;

a movable handrail for gripping by persons transported by the movable support member; and a disinfecting device which is installed and positioned for disinfecting the movable handrail during movement of the handrail past the disinfecting device.

By movable walkway is meant a personal conveyance device or system which provides a movable support member on which persons can be supported while the support member moves along a conveyance path. The term "movable walkway" thus includes not only horizontal or slightly inclined movable walkways, sometimes referred to as travelators, but also includes escalators, which provide movable staircases for transporting persons along a steeper incline.

Typically, the installation includes a movable walkway which provides an endless movable support member which is movable along an endless course, the movable walkway including an endless band operatively connected to the support member for synchronous movement therewith along a separate endless course such that, along a part of its course, the band provides the handrail for gripping by persons supported on the support member, the handrail being spaced above the support member and being movable in a direction parallel to the direction of movement of the support member, the disinfecting device being installed at a fixed position adjacent the course of the band and operable to provide at least intermittent disinfection of the band as it moves past the disinfecting device.

The band may be guided on its endless course by a handrail guide, the band extending peripherally along and around the handrail guide, the handrail guide being positioned to extend alongside and parallel to the movable support member, the disinfecting device being positioned and oriented to disinfect an outer surface of the band on the side thereof which is opposite from the handrail guide, its being appreciated that it is this outer surface of the band which will, in use, come into contact with the hands of users holding the handrail, and which will thus be most in need of disinfecting.

The endless course of the band typically has a forward leg in which the band is spaced above the support member and is movable in the same direction as a forward supporting leg of the support member where the support member faces upwardly, and a return leg in which the band is movable in the opposite direction, the disinfecting device being positioned for disinfecting the endless band on its return leg. In most cases, the disinfecting device will thus not be visible to users of the walkway or escalator.

The disinfecting device may comprise an irradiating arrangement or an irradiating means for disinfecting the endless band by irradiating it with electromagnetic waves selected to have a disinfecting or germicidal effect. Typically, the irradiating arrangement is configured to produce ultra-violet waves, the ultra-violet radiation preferably being middle or extreme ultra-violet radiation, having a wavelength of between 180 and 290 nm and being produced by a lamp having a wattage of 10-30 watt. The irradiating arrangement may include a housing in which a suitable source of electromagnetic radiation, typically a lamp, is housed, the housing being configured to permit passage of the endless band in a longitudinal direction through the housing.

The housing may be shaped at least partially to surround the band, when the band is viewed in cross-section, the housing having a reflective interior which is shaped such that, in use, substantially the entire exposed cross-sectional periphery of the band is subjected to disinfecting or germicidal radiation. To this end, the housing may be installed such that a slack portion of the band passes through the housing.

Instead, the disinfecting device may be arranged to deposit a disinfectant or germicidal substance on the endless band, the disinfecting device optionally including a pad which is impregnated with the disinfectant or germicidal substance, the disinfectant device also including an urging means for urging the pad into contact with the band as the band is moved past the disinfecting device, so that the pad is configured to clean the band by abrasion and simultaneously to deposit a film of the disinfectant or germicidal substance on the band.

The invention extends to a disinfecting device suitable for forming part of a moving walkway or escalator installation as defined above.

The invention extends to a method of operating a movable walkway, which method includes at least intermittently disinfecting a movable handrail of the walkway by means of a disinfecting device installed at a position at or adjacent an endless course along which the handrail moves, so that the handrail is disinfected as it moves past the disinfecting device on its endless course.

The method typically includes continuously disinfecting the handrail as it moves past the installed disinfecting device.

In one embodiment of the invention, disinfecting the handrail comprises irradiating the handrail with electromagnetic waves of which the wavelength is selected to have a germicidal or disinfectant effect.

The invention extends to a method of operating a movable walkway, which method includes installing a disinfecting device adjacent the movable walkway, to form a movable walkway installation as defined above. It will be appreciated that an existing walkway or escalator can, by performance of this method, be converted to a movable walkway installation as defined above.

The invention will now be further described, by way of example, with reference to the accompanying diagrammatic drawings, in which.

Figure 1:
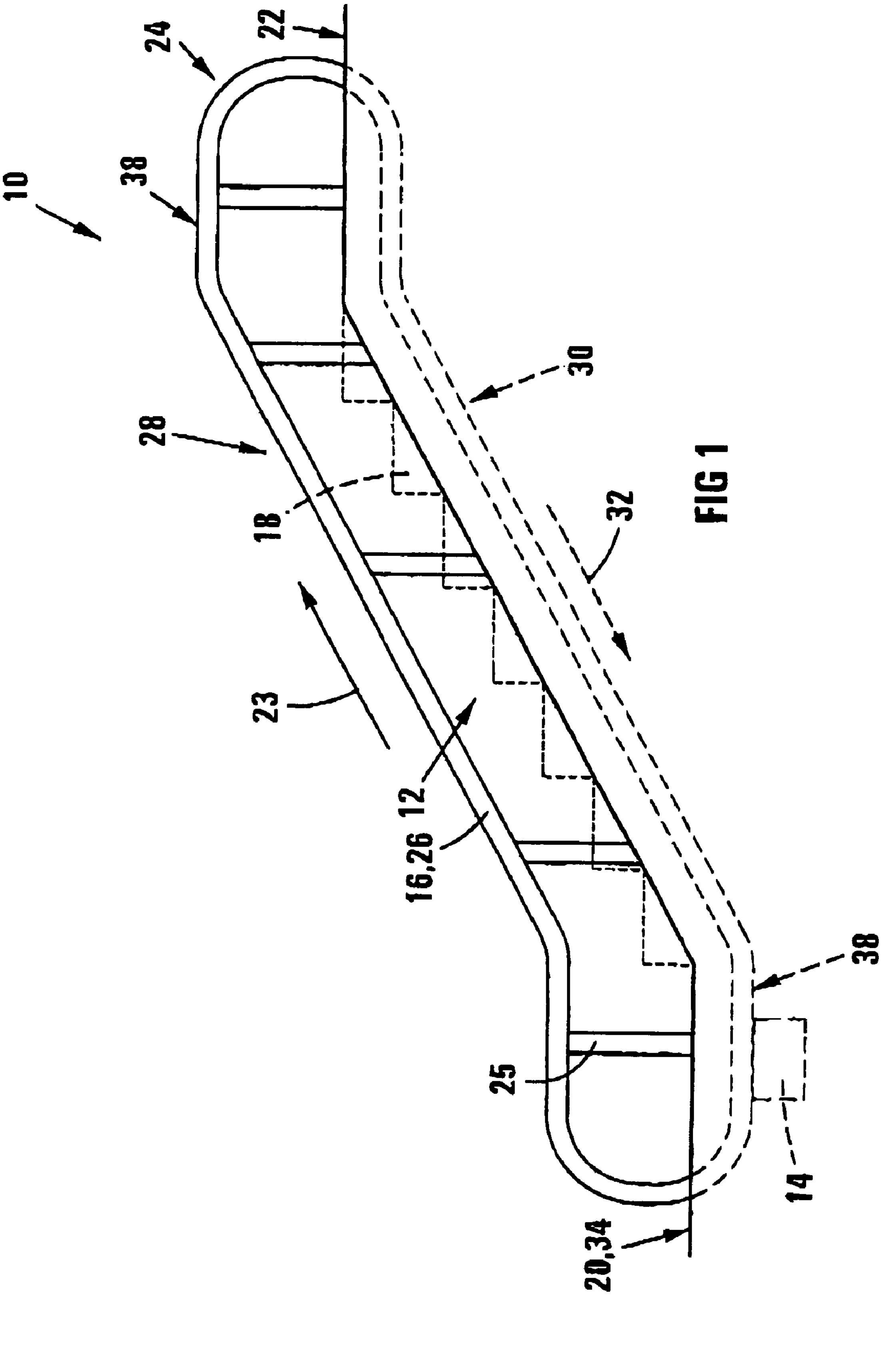
FIG. 1 is a schematic side elevation of an escalator installation in accordance with the invention.

In the drawings, reference numeral 10 generally indicates a movable walkway installation, in this example being an escalator installation, in accordance with the invention. The installation 10 comprises an escalator 12 and a pair of disinfecting devices 14 for disinfecting a movable handrail 16 of the escalator 12.

The escalator 12 provides an endless movable support member 18 for transporting persons (not shown) supported thereon along a path extending from one end of the escalator 12 to the other end thereof. The support member 18 is inclined, in this example moving forwardly from a lower landing 20 to a higher landing 22 in the direction of arrow 23.

A pair of balustrades 24 comprising handrail guides is positioned alongside the support member 18, the balustrades 24 being on opposite sides of member 18, each balustrade 24 extending parallel to the support member 18. Each balustrade 24 has a series of uprights or posts 25 which are transversely spaced apart in series, an endless rail 27 (FIG. 3) extending along the upper and lower ends of the series of posts 25.

Each balustrade 24 has mounted thereon an endless band 26 which is movable along an endless path or course. The band 26 is supported on and longitudinally slidably engaged with the rail 27 of the balustrade 24, so that the band 26 extends along and around the periphery of the balustrade 24, the periphery of the balustrade 24 defining the endless course of the band 26. In conventional fashion, the band 26 is of a flexible polymeric or elastomeric plastics material, in this case being of rubber. The endless course comprises an upper, forward leg 28 along which the band 26 moves in a direction parallel to the forward direction of movement of the support member 18 (indicated by arrow 23), and a lower return leg 30, in which the band 26 moves in the opposite direction, indicated by arrow 32. Along the upper leg 28, the band 26 thus provides a moving handrail for persons supported on the support member 18.

A disinfecting device 14 is installed adjacent the endless course of each band 26 at a position under the endless course on its return leg 30. As can best be seen in FIG. 1, each disinfecting device 14 is thus installed underground, beneath the surface 34 of the lower landing 20, and is thus not visible to users of the escalator 12.

Figure 3:
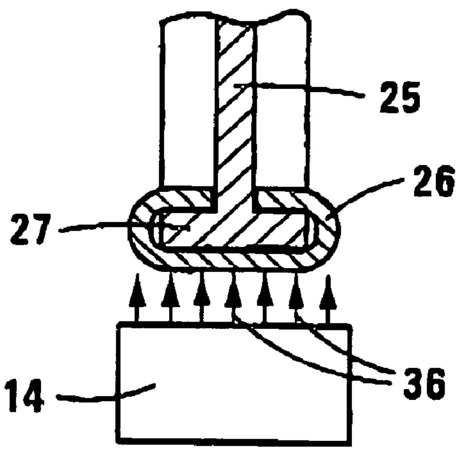
FIG. 3 is a detailed part-sectional schematic end elevation of a disinfecting device forming part of the escalator installation of FIG. 2, on an enlarged scale.

Each disinfecting device 14 comprises an irradiating means or irradiating device for irradiating the endless band 26 with disinfecting radiation in the form of electromagnetic waves, in this case ultra-violet waves 36, of which the wavelength and intensity are selected such that the ultra-violet waves 36 have a germicidal or disinfecting effect on the band 26. As can be seen in FIG. 3 of the drawings, an outer surface 38 of the band 26 which, at the position of the device 14, faces outwardly and downwardly away from the rail 27, can be exposed to the ultra-violet radiation and can thus be disinfected.

In use, the outer surface 38 of the band 26 is intermittently or continuously exposed to contact with the hands of users of the escalator 12, who use the band 26 as a handrail. It is well known that such contact can infect the handrail 16 with germs and viruses which are transmissible from one user to another. However, as each band 26 moves past its associated disinfecting device 14, these germs and viruses are killed or disabled by exposure to the ultra-violet radiation, thus disinfecting the outer surface 38 of the band 26. The transmission of infections or diseases from one user to another via the handrail 12 is thus inhibited.

It should be appreciated that although, in this example, the disinfecting device 14 comprises an irradiating means, in other embodiments of the invention the disinfecting device 14 can instead be arranged operably to deposit a disinfecting substance on the endless band 26.

Figure 4:
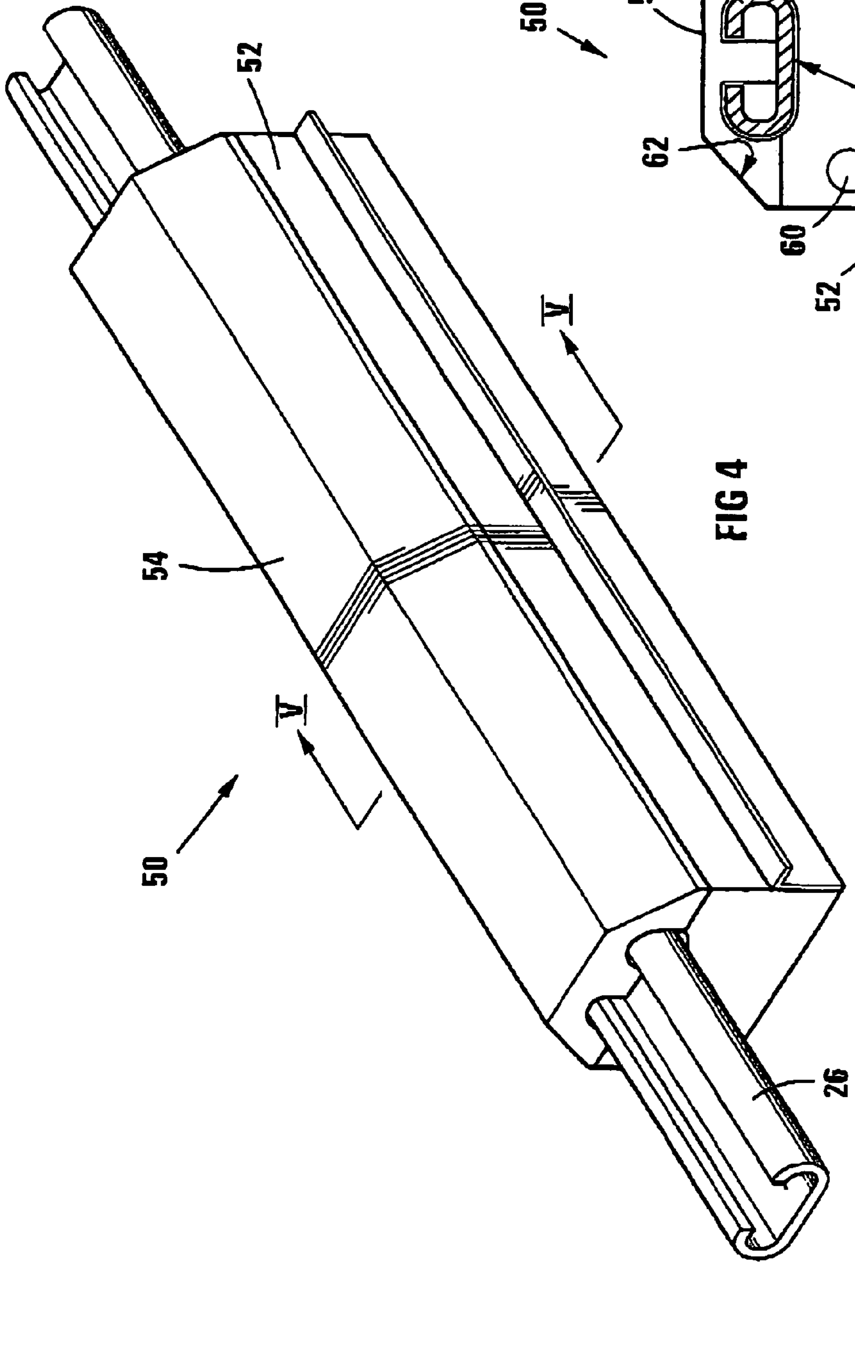
FIG. 4 is a schematic partial three-dimensional view from above of a further embodiment of an escalator installation in accordance with the invention.
Figure 5:
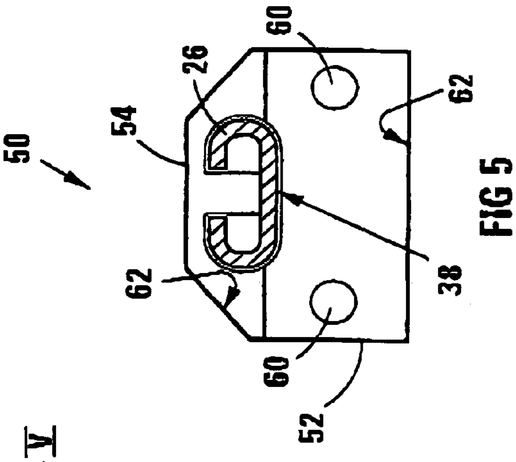
FIG. 5 is a schematic sectional elevation of the installation of FIG. 4, taken along line V-V in FIG. 4.

In FIGS. 4 and 5 of the drawings, reference numeral 50 generally indicates a part of a further embodiment of an escalator installation in accordance with the invention. The installation 50 of FIG. 4 is functionally similar to the installation 10 of FIG. 1, like reference numerals indicating like parts in FIGS. 1 to 3 and in FIGS. 4 to 5.

Figure 2:
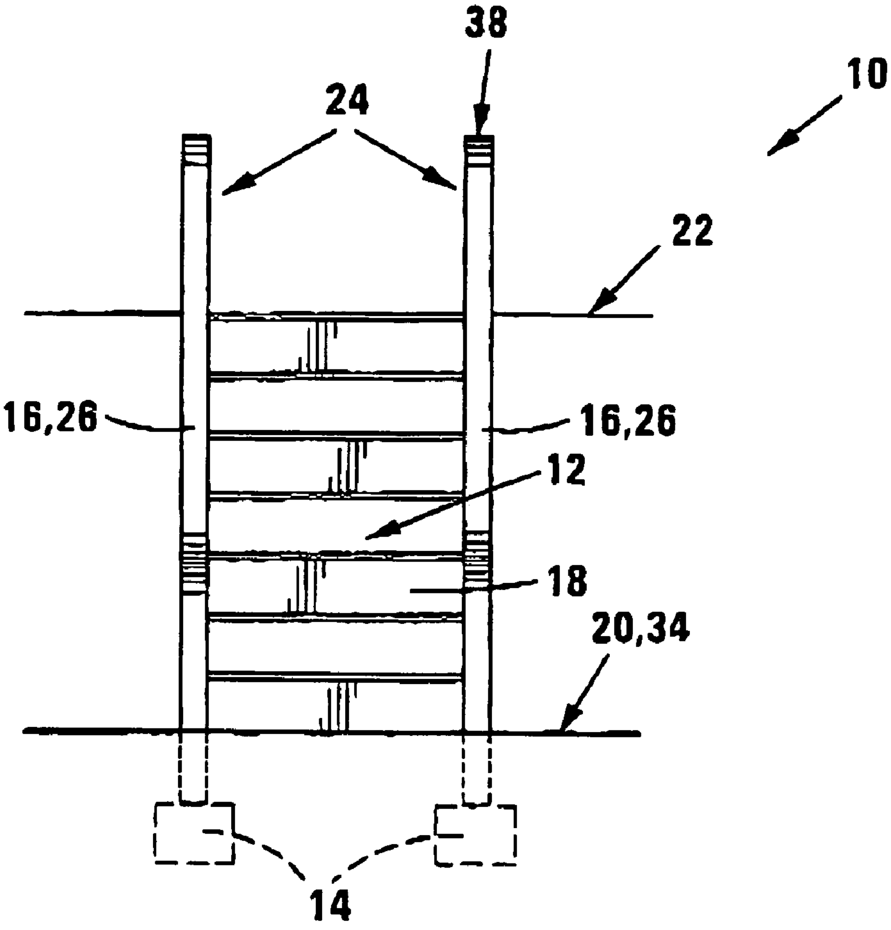
FIG. 2 is a schematic end view of the escalator installation of FIG. 1.

The main distinction between the installation 50 and the installation 10 of FIG. 1 is that the irradiating means includes a pair of ultra-violet lamps 60 housed in an enclosed housing 52 through which the band 26 passes longitudinally. The housing 52 thus extends around the band 26, when the band is viewed in cross-section (FIG. 5), so that substantially no ultra-violet radiation escapes the housing 52, thus shielding users from ultra-violet radiation. In this example, the housing 52 is installed at a part of the endless course of the band 26 where it is not guided by the rail 27, in other words in a slack portion of the band 26, so that the housing 52 completely envelops and surrounds the band 26 where it passes through the housing 52. It should be appreciated, however, that the housing 52 can, in other examples, be configured for installation such that a part of the rail 27 is located inside the housing 52.

In this example the lamps 60 are in the form of elongated tubes which extend parallel to the lengthwise direction of the band 26 where it passes through the housing 52. The lamps 60 respectively have a wattage of 30 watt and produce ultra-violet radiation in the extreme range of ultra-violet radiation. The housing 52 is longitudinally split, having a removable lid or cover 54 for permitting ready installation of the housing 52 and for allowing maintenance personnel to access the lamps 60.

The inner walls of the housing 52, which form the interior 62 of the housing, have a mirror-finish, thus being reflective to ultra-violet radiation. In use, ultra-violet waves emanating from the lamps 60 are thus reflected by the interior of the housing 52 such that not only the outwardly facing surface 38 of the band 26, but also the opposing side and surfaces of the band 26, are exposed to disinfecting ultra-violet radiation.

It is an advantage of the escalator installation 10 as described with reference to the drawings that the provision of the disinfecting devices 14 inhibits the transmission of germs or viruses between users who hold the same portion of the band 26 on successive passes of the band 26 on the upper leg 28 of its endless path or course.

It is also an advantage of the illustrated example that no substances are deposited on the band 26, so that the outer surface 38 of the band is not wet or sticky to the touch, and no replacement of any disinfectant substances is required.

The irradiating device 14 is compatible with any existing walkway or escalator, so that the device 14 can be retrofitted to existing walkways or escalators, to form an installation 10 as described with reference to the drawings. It is also envisaged that the band 26 can be at least partially transparent, in which case the disinfecting device can be used to disinfect areas located between the band 26 and the rail 27.

The invention claimed is:

1. A movable walkway installation which includes:

a movable support member for transporting persons supported thereon;

a movable handrail for gripping by persons transported by the movable support member, the movable handrail comprising an endless band which is operatively connected to the movable support member for synchronous movement therewith; and a disinfecting device which is installed and positioned for disinfecting the band during movement of the band past the disinfecting device, the disinfecting device comprises an irradiating arrangement for disinfecting the endless band by irradiating it with electromagnetic waves selected to have a disinfecting or germicidal effect, and the disinfecting device being configured for subjecting, in use, an entire exposed cross-sectional periphery of the band to disinfecting or germicidal radiation.

2. The movable walkway installation as claimed in claim 1, in which the disinfecting device includes a housing in which a lamp for producing disinfecting electromagnetic radiation is housed, the housing being configured to permit passage of the band through the housing in a longitudinal direction.

3. The movable walkway installation as claimed in claim 2, in which the housing is shaped at least partially to surround the band, when the band is viewed in cross-section, the housing having a reflective interior.

4. The movable walkway installation as claimed in claim 1, in which the irradiating arrangement is configured to produce ultra-violet waves.

5. The movable walkway installation as claimed in claim 1, which includes a movable walkway which provides an endless movable support member which is movable along an endless course, the endless band being operatively connected to the support member for synchronous movement therewith along a separate endless course such that, along a part of its course, the band provides the handrail for gripping by persons supported on the support member, the handrail being spaced above the support member and being movable in a direction parallel to the direction of movement of the support member, the disinfecting device being installed at a fixed position adjacent the course of the band and operable to provide at least intermittent disinfection of the band as it moves past the disinfecting device.

6. The movable walkway installation as claimed in claim 5, in which the band is guided on its endless course by a handrail guide, the band extending peripherally along and around the handrail guide, the handrail guide being positioned to extend alongside and parallel to the movable support member, the disinfecting device being positioned and oriented to disinfect at least an outer surface of the band on the side thereof which is opposite from the handrail guide.

7. The movable walkway installation as claimed in claim 5, in which the endless course of the band has a forward leg in which the band is spaced above the support member and is movable in the same direction as a forward supporting leg of the support member where the support member faces upwardly, and a return leg in which the band is movable in the opposite direction, the disinfecting device being positioned for disinfecting the endless band on its return leg.

8. The movable walkway installation as claimed in claim 7, in which the disinfecting device includes a housing in which a lamp for producing disinfecting electromagnetic radiation is housed, the housing being configured to permit passage of the band through the housing in a longitudinal direction.

9. The movable walkway installation as claimed in claim 8, in which the housing is shaped at least partially to surround the band, when the band is viewed in cross-section, the housing having a reflective interior.

10. The movable walkway installation as claimed in claim 8, in which the lamp is an ultra-violet lamp.

11. A disinfecting device suitable for installation adjacent an endless course of a movable handrail band of a movable walkway, the device including an irradiating arrangement for disinfecting the endless band by irradiating it with electromagnetic waves selected to have a disinfecting or germicidal effect, and the disinfecting device being configured for subjecting, in use, an entire exposed cross-sectional periphery of the band to disinfecting or germicidal radiation.

12. A method of operating a movable walkway, which method includes at least intermittently disinfecting a movable handrail of the walkway by means of a disinfecting device installed at a position at or adjacent an endless course along which the handrail moves, so that the handrail is disinfected as it moves past the disinfecting device on its endless course disinfecting the handrail comprising irradiating the entire exposed cross-sectional periphery of the handrail with electromagnetic waves of which the wavelength is selected to have a germicidal or disinfectant effect.

13. The method as claimed in claim 12, which includes continuously disinfecting the handrail as it moves past the installed disinfecting device.

* * * * *